United States Patent
Rausch et al.

(10) Patent No.: US 8,248,040 B2
(45) Date of Patent: Aug. 21, 2012

(54) TIME-LIMITING MODE (TLM) FOR AN INTERLEAVED POWER FACTOR CORRECTION (PFC) CONVERTER

(75) Inventors: Gregory J. Rausch, Minnetonka, MN (US); Michael J. Gaboury, Burnsville, MN (US); Shohei Osaka, Saitama (JP)

(73) Assignee: Polar Semiconductor Inc., Bloomington, MN (US)

( * ) Notice: Subject to any disclaimer, the term of this patent is extended or adjusted under 35 U.S.C. 154(b) by 322 days.

(21) Appl. No.: 12/617,662

(22) Filed: Nov. 12, 2009

(65) Prior Publication Data
US 2011/0110132 A1    May 12, 2011

(51) Int. Cl.
  G05F 1/70   (2006.01)
  G05F 3/16   (2006.01)
  G05F 1/00   (2006.01)
(52) U.S. Cl. ......... 323/207; 323/285; 323/272; 323/225
(58) Field of Classification Search .......... 323/205, 323/207, 225, 272, 282, 284, 285
See application file for complete search history.

(56) References Cited

U.S. PATENT DOCUMENTS

| | | | |
|---|---|---|---|
| 5,847,548 A | 12/1998 | He et al. | |
| 5,861,734 A | 1/1999 | Fasullo et al. | |
| 5,905,369 A | 5/1999 | Ishii et al. | |
| 6,091,233 A | 7/2000 | Hwang et al. | |
| 6,222,746 B1 | 4/2001 | Kim | |
| 6,448,745 B1 | 9/2002 | Killat | |
| 6,690,589 B2 | 2/2004 | Barnett et al. | |
| 6,949,915 B2 * | 9/2005 | Stanley | 323/207 |
| 7,019,502 B2 | 3/2006 | Walters et al. | |
| 7,116,087 B2 * | 10/2006 | Zhang et al. | 323/272 |
| 7,391,631 B2 * | 6/2008 | Shimada | 363/89 |
| 7,535,204 B1 * | 5/2009 | Nadimpalli et al. | 323/222 |
| 7,567,069 B2 * | 7/2009 | Ryu et al. | 323/282 |
| 7,777,461 B2 * | 8/2010 | Martin et al. | 323/272 |
| 7,800,354 B2 | 9/2010 | Kanouda et al. | 323/285 |
| 7,880,453 B2 * | 2/2011 | Koo et al. | 323/283 |
| 7,884,588 B2 * | 2/2011 | Adragna et al. | 323/272 |
| 8,040,703 B2 * | 10/2011 | Melanson | 363/89 |
| 2007/0253223 A1 | 11/2007 | Neidorff et al. | |
| 2007/0253224 A1 | 11/2007 | Cohen et al. | |
| 2007/0262756 A1 | 11/2007 | Valley et al. | |

(Continued)

OTHER PUBLICATIONS

Chris Bridge and Laszlo Balogh, Understanding Interleaved Boundary Conduction Mode PFC Converters, Fairchild Semiconductor Power Seminar, 2008-2009. Jon Harper, Improving Efficiency and Reliability Using Interleaved Boundary Conduction Mode Power Factor Correction, www.Fairchildsemi.com, Jul. 2009.

*Primary Examiner* — Adolf Berhane
*Assistant Examiner* — Zekre Tsehaye
(74) *Attorney, Agent, or Firm* — Kinney & Lange, P.A.

(57) ABSTRACT

The present invention provides a method of controlling an interleaved power factor correction (PFC) circuit operating in a discontinuous conduction mode (DCM). The controller employs a normal mode of operation in which inductor currents in each PFC sub-circuit are estimated based on the monitored input voltage and monitored output voltage, and switching devices associated with each PFC sub-circuit are controlled to ensure DCM operation. As the input voltage increases, the OFF times of each PFC sub-circuit increase such that the inductor currents no longer overlap. In response, the controller activates a time-limiting mode (TLM) in which OFF time durations for each sub-circuit are based on the monitored sum of load currents as opposed to the monitored input voltage and monitored output voltage.

13 Claims, 3 Drawing Sheets

U.S. PATENT DOCUMENTS

| | | |
|---|---|---|
| 2007/0262823 A1 | 11/2007 | Cohen et al. |
| 2008/0197817 A1 | 8/2008 | Colbeck et al. |
| 2008/0316783 A1 | 12/2008 | O'Loughlin |
| 2009/0290395 A1* | 11/2009 | Osaka .......................... 363/126 |
| 2009/0295349 A1* | 12/2009 | Tao et al. ...................... 323/282 |
| 2010/0097041 A1* | 4/2010 | Ayukawa et al. ............. 323/272 |
| 2010/0097828 A1* | 4/2010 | Chen ............................... 363/72 |
| 2010/0109626 A1* | 5/2010 | Chen ............................. 323/282 |

* cited by examiner

TIME-LIMITING MODE (TLM) FOR AN INTERLEAVED POWER FACTOR CORRECTION (PFC) CONVERTER

RELATED APPLICATIONS

This application is related to U.S. provisional patent application Ser. No. 61/260,791, filed on even date herewith, titled "SAVING ENERGY MODE (SEM) FOR AN INTERLEAVED POWER FACTOR CORRECTION (PFC) CONVERTER", by Michael Gaboury, Gregory Rausch, and Shohei Osaka, and U.S. non-provisional patent application Ser. No. 12/617,664, filed on even date herewith, titled "FREQUENCY COMPRESSION FOR AN INTERLEAVED POWER FACTOR CORRECTION (PFC) CONVERTER", by Michael Gaboury, Gregory Rausch, and Shohei Osaka.

BACKGROUND

The present invention relates to power factor correction (PFC) converters, and more particularly to interleaved PFC converters.

Electric power is distributed almost universally in an alternating current (AC) format that allows for efficient transmission. Most devices however, including personal computers, televisions, etc., require direct current (DC) power. Power supplies act to convert the AC input supplied by a line to a DC output suitable for consumption by a device or load or act to convert a DC input to a DC output (i.e., a DC-to-DC converter). A switched-mode power supply (SMPS) employing a boost regulator is commonly employed in this role of AC-to-DC or DC-to-DC power conversion. A benefit of employing a SMPS having a boost regulator topology is the boost regulator can be controlled to provide power factor correction. Subsequent stages may be employed to step-down the output of the PFC boost regulator to a desired DC output voltage.

A boost regulator includes an inductor connected between a rectified input and the DC output. A shunt switch is selectively controlled to charge the inductor (during ON times of the switch) and to discharge the inductor to the DC output (during OFF times of the switch). The power capability of a converter may be increased (or alternatively, the size of the converter decreased) by connecting PFC boost regulators in parallel with one another and controlling them in an interleaved manner to provide the desired output. In a discontinuous conduction mode (DCM), each inductor must be completely discharged before the switch associated with the inductor is turned ON. If the discharge cycle is not complete (i.e., current through the inductor at the beginning of the charging cycle is non-zero), the converter operates in a continuous conduction mode (CCM) that is detrimental to control of the output voltage. Efficient operation of the PFC boost regulators therefore requires accurate monitoring of the current through each inductor. Prior art methods monitor the current through each inductor directly using either an auxiliary winding or transformer associated with each inductor. However, this requires additional and larger hardware, thereby increasing the size and cost of the device.

SUMMARY

An interleaved power factor correction (PFC) converter includes a rectifier circuit, a first PFC sub-circuit, a second PFC sub-circuit connected in parallel with the first PFC sub-circuit, and a controller. Each PFC sub-circuit includes an inductor and a switching device, wherein the switching device is turned ON to cause the inductor to store energy provided by the rectifier circuit and is turned OFF to cause the inductor to discharge stored energy to a direct current (DC) output voltage. The controller generates drive signals provided to the switching device in each PFC sub-circuit. During a normal mode of operation, the controller determines ON and OFF time durations of each switch based on signals representing the rectified input voltage and the DC output voltage. The controller activates a time-limiting mode in which the OFF time durations are based on a monitored inductor current.

DETAILED DESCRIPTION

The present invention provides a system and method of controlling an interleaved power factor correction (PFC) circuit operating in a discontinuous conduction mode (DCM). The controller employs a normal mode of operation in which inductor currents in each PFC sub-circuit are estimated based on the monitored input voltage and monitored output voltage, and switching devices associated with each PFC sub-circuit are controlled to ensure DCM operation, in which OFF times ensure that inductor charging is initiated only after the inductor has been totally discharged (i.e., inductor current equals zero). As the input voltage increases, the OFF time associated with each PFC sub-circuit increases to ensure DCM operation. For interleaved PFC converters, the increased OFF time may result in a condition in which the inductor currents through each PFC sub-circuit do not overlap. In response, the controller activates a time-limiting mode (TLM) in which OFF time durations for each sub-circuit are based on the monitored load current as opposed to the monitored input voltage and monitored output voltage.

Figure 1:
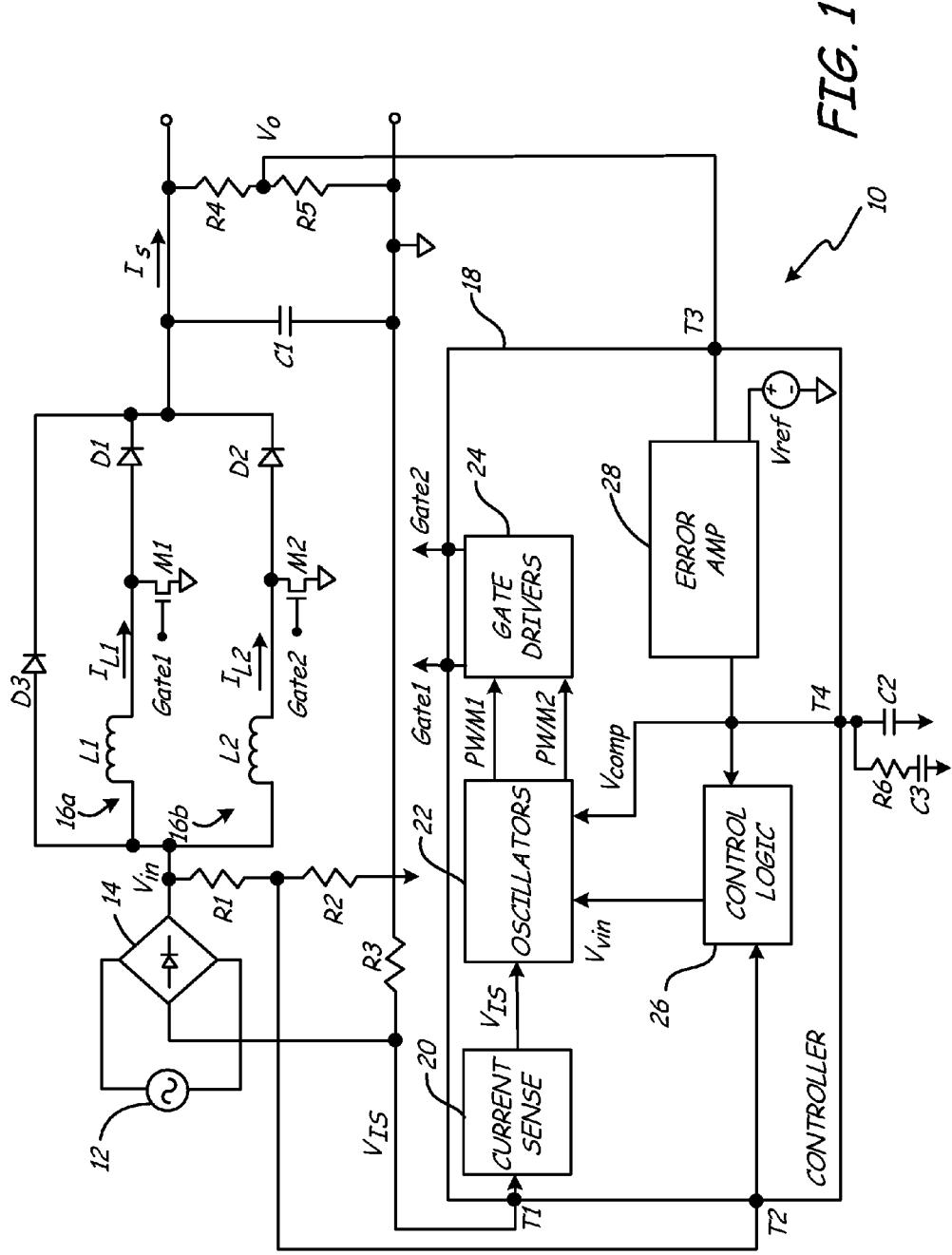
FIG. 1 is a circuit diagram of a two-phase interleaved power factor correction (PFC) circuit according to an embodiment of the present invention.

FIG. 1 is a circuit diagram illustrating a power factor correction (PFC) circuit 10 according to an embodiment of the present invention. PFC converter 10 is connected to receive alternating current (AC) power from AC power supply 12. PFC converter 10 includes rectifier circuit 14, first PFC sub-circuit 16a, which includes inductor L1, transistor M1, and diode D1, second PFC sub-circuit 16b, which includes inductor L2, transistor M2, and diode D2, capacitors C1, C2, and C3, resistors R1, R2, R3, R4, R5, and R6, and controller 18, which includes current sense circuit 20, oscillator circuit 22, gate drive circuit 24, control logic 26 and error amplifier circuit 28.

In the embodiment shown in FIG. 1, interleaved PFC converter 10 is comprised of two PFC sub-circuits 16a and 16b, connected in parallel with one another to convert alternating current (AC) input provided by AC source 12 and rectified by rectifier circuit 14 to the desired DC output voltage Vo. Transistors M1 and M2 are selectively turned ON and OFF to charge and discharge inductors L1 and L2, respectively. For example, when transistor M1 is ON, rectified input voltage Vin provides charging power to inductor L1. When transistor M1 is OFF, energy stored in inductor L1 is discharged through diode D1 to output voltage Vo. Resistors R1 and R2 form a voltage divider for providing a voltage signal proportional to the input voltage Vin. Similarly, resistors R4 and R5 form a voltage divider for providing a voltage signal proportional to the output voltage Vo. Resistor R3 is connected to generate a voltage signal proportional to the sum of the inductor currents Is.

Controller 18 includes input terminals T1, T2, T3, and T4 for monitoring the operation of PFC converter 10 and output terminals Gate1 and Gate2 for providing gate drive signals to transistors M1 and M2. Input terminal T1 receives a voltage signal $V_{IS}$ representative of the inductor current IS. Input terminal T2 receives a voltage signal representative of the rectified input voltage Vin provided as an input to interleaved PFC converter 10 and input terminal T3 receives a voltage signal representative of the output voltage $V_o$ provided by PFC converter 10. The input terminal T4 provides an amplified error signal that reflects differences between the monitored output voltage Vo and a reference voltage Vref.

Current sense circuit 20 generates signal $V_{IS}$ representing the inductor current Is based on the voltage signal provided to input terminal T1. Likewise, error amplifier circuit 28 generates an output based on differences between the signal representing the monitored output voltage Vo provided at input terminal T3 and the reference voltage Vref. The output of error amplifier circuit 28 is modified by input terminal T4 and an associated filter network (comprised of resistor R6 and capacitors C2 and C3) to generate the amplified error signal Vcomp provided to oscillator circuit 22 and control logic 26.

Oscillator circuit 22 generates PWM signals ($PWM_1$, $PWM_2$) provided to gate driver circuit 24 that dictate the ON and OFF cycles of transistors M1 and M2, respectively, to ensure DCM operation in which each inductor is fully discharged before the next charging cycle can begin. In particular, this requires oscillator circuit 22 to ensure that inductor current has fallen to zero before turning ON a transistor associated with the inductor. As described in more detail with respect to FIG. 2, oscillator circuit 22 employs two modes of operation for ensuring DCM operation. In a first (normal) mode, oscillator circuit 22 estimates the OFF time required to discharge each inductor based on the monitored input voltage $V_{in}$ (labeled $V_{Vin}$ into oscillator 22), amplified error signal Vcomp, and monitored output voltage $V_o$. In addition, oscillator circuit 22 selectively activates a TLM mode in which the duration of OFF times is based on the monitored inductor current Is (represented by the voltage signal $V_{Is}$ provided at input terminal T1). The TLM mode is only applicable in situations in which the monitored inductor current Is represents the current through a single inductor, and not the combined currents through inductors L1 and L2.

U.S. application Ser. No. 12/428,557 (titled "Power Factor Converter Circuit"), filed Apr. 23, 2009 and claiming priority to Japanese Appln. No. 2008/134539JP, filed May 22, 2008, Assigned to Sanken Electric Co., Ltd., incorporated by reference herein, describes a controller that detects inductor current zero crossings based on the monitored input voltage and monitored output voltage (as opposed to directly monitoring the event through each inductor). In one disclosed embodiment, the ON time of the switch element is defined as proportional to an amplified error signal $V_{comp}$ and the OFF time of the switch element is based on a comparison between the result of calculations performed on the monitored input voltage $V_{in}$, the monitored output voltage $V_o$, and the monitored amplified error signal $V_{comp}$. In another embodiment, the ON time of the switch element is set based on a comparison between an integrated value of the input voltage signal $V_{in}$ and calculations performed on the monitored input voltage $V_{in}$ and the amplified error signal, and the OFF time is set based on a comparison between the result of calculations performed on the monitored input voltage $V_{in}$ and the amplified error signal $V_{comp}$ and an integrated value of differences between the output voltage $V_o$ signal and the input voltage signal $V_{in}$.

However, during certain operating conditions (e.g., input voltage $V_{in}$ is relatively high) the ON times of the switches do not overlap in the interleaved PFC converter. In these instances, the monitored inductor current Is reflects the current through each inductor, as opposed to the sum of the currents through inductors L1 and L2. The present invention takes advantage of this condition to detect inductor current zero crossings based on the monitored inductor current Is. In addition, large input voltages $V_{in}$ relative to the monitored output voltage $V_o$ cause the signals (i.e., proportional currents) employed to calculate the duration of OFF times to become proportionally small, and therefore prone to errors that may lead to undesirably long OFF times. Hence, the mode of operation in which the monitored inductor current Is is employed to calculate OFF times is referred to as the 'time-limiting mode' (TLM) because it limits undesirable and inaccurate OFF times. For example, in one embodiment controller 18 enables TLM operation in response to the monitored input voltage $V_{in}$ exceeding a threshold value.

Figure 2:
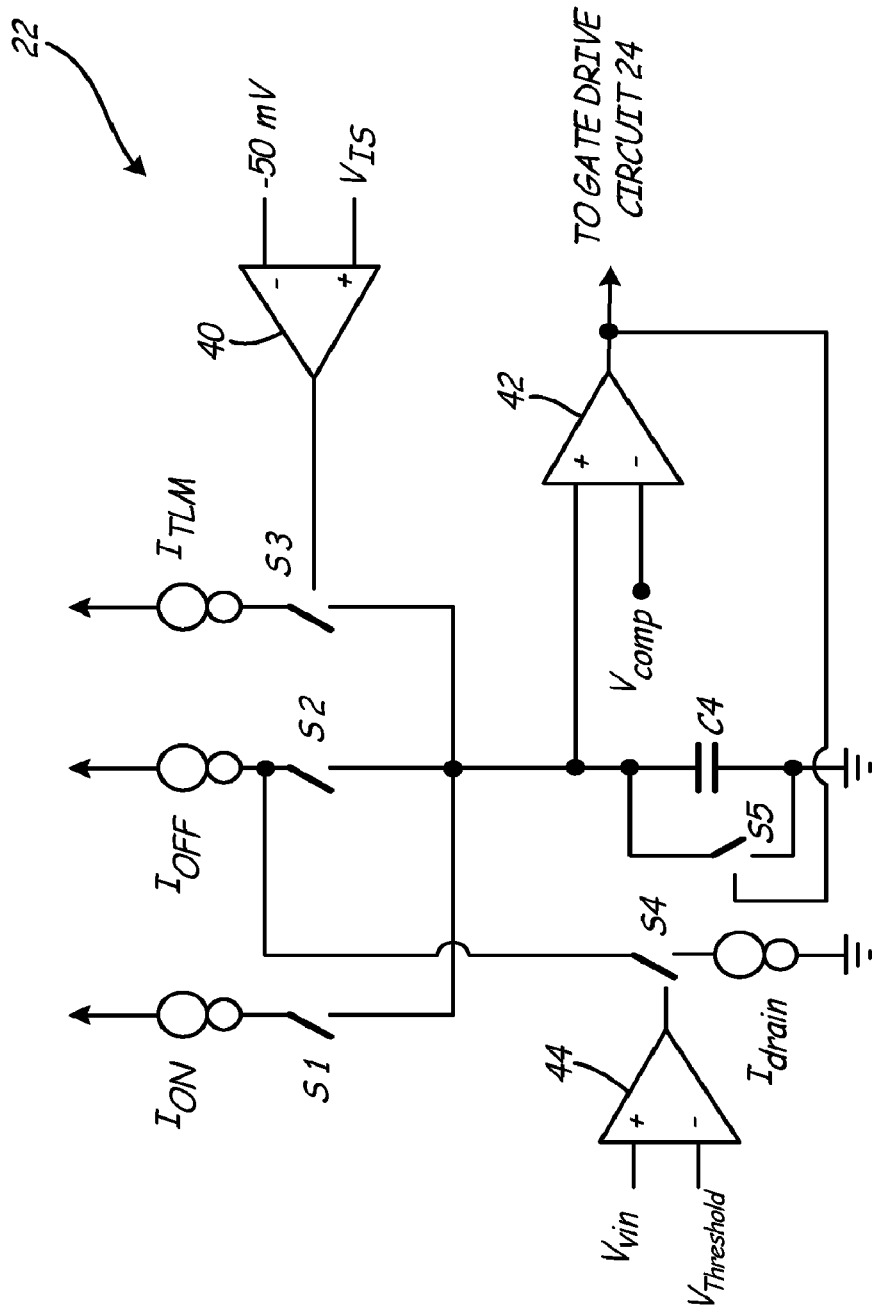
FIG. 2 is a simplified circuit diagram illustrating oscillator circuitry for generating the desired gate drive signals in normal modes of operation and time-limiting modes (TLM) of operation according to an embodiment of the present invention.

FIG. 2 is a simplified circuit schematic illustrating operations performed by oscillator circuit 22 in generating control signal PWM1 (which in turn is employed to generate gate drive signal Gate1). For the sake of simplicity, only one channel is illustrated, although identical components would be provided to generate the control signal PWM2. In this embodiment, oscillator circuit 22 includes switches S1, S2, S3, S4 and S5, comparator circuits 40, 42, and 44, and current sources labeled $I_{ON}$, $I_{OFF}$, $I_{TLM}$, and $I_{drain}$. In one embodiment, current sources $I_{ON}$ and $I_{OFF}$ generate currents that are proportional to monitored inputs, as defined by the following equations:

$$I_{ON} = \frac{K}{Vcomp} \qquad \text{Equation 1}$$

$$I_{OFF} = \frac{V_o - V_{in}}{V_{in}} * I_{ON} \qquad \text{Equation 2}$$

In this embodiment, the magnitude of the current source $I_{on}$ is related to the amplified error signal Vcomp (which is in turn a function of the AC input voltage $V_{in}$ and the inductor current $I_S$). The magnitude of the current source $I_{OFF}$ is related to the monitored output voltage $V_o$, the monitored input $V_{in}$, and the magnitude of the current source $I_{ON}$ (i.e., the ON time).

In this embodiment, the current sources $I_{OFF}$ and $I_{ON}$ are connected to selectively charge capacitor C4 through switches S1 and S2, respectively. During normal operation, the ON time of the transistor (e.g., transistor M1) is based on the time required for current source $I_{ON}$ to charge capacitor C4. Following charging by current source $I_{ON}$, the capacitor is quickly discharged by closing switch S5. The OFF time of the transistor is based on the time required for current source $I_{OFF}$ to charge capacitor C4. Additional logic (such as a latch circuit) connected at the output of comparator 42 generates the corresponding train of PWM signals provided to gate drive circuit 24 and provides feedback pulses to switch S5 to discharge capacitor C4 after each charge/discharge cycle. In other embodiments the capacitor is charged by current source $I_{ON}$ and discharged by current source $I_{OFF}$, wherein the OFF time is determined by the time required for current source $I_{OFF}$ to discharge the capacitor (e.g., in one embodiment, a separate comparator is employed to determine when the capacitor has been sufficiently discharged by current source $I_{OFF}$).

The normal mode of operation allows controller 18 to estimate the current through each inductor without requiring actual monitoring of the current through each inductor. However, for situations in which the ON times of the transistors do not overlap (such that the currents through each inductor do not overlap), the monitored inductor current Is (provided by the representative voltage signal $V_{Is}$ at terminal T1) is indicative of the current through each individual inductor and can be used to determine the duration of the OFF times.

In addition, based on relationships defined by Equation 2 (provided above), the magnitude of current source $I_{OFF}$ becomes increasingly small as the value of the monitored input voltage becomes relatively large as compared to the monitored output voltage $V_o$. As the magnitude of the current signal $I_{OFF}$ becomes small, the time required to charge capacitor C4 can become very inaccurate. To limit undesirably long OFF times the present invention activates the time-limiting mode (TLM). Activation of TLM results in OFF time durations being determined not by the magnitude of the current source $I_{OFF}$, but by the monitored inductor current Is crossing a zero threshold. In the embodiment shown in FIG. 2, comparator 40 compares the monitored load current Is (represented by the voltage $V_{Is}$ provided to terminal T1) to a nearly zero threshold value (e.g., −50 mV, wherein the voltage signal is inversely related to inductor current Is). When the voltage signal rises above −50 mV, indicating the inductor is discharged (or very nearly discharged), switch S3 is closed to connect current source $I_{TLM}$ to capacitor C4. Current source $I_{TLM}$ is a relatively large current source that quickly charges capacitor C4 and therefore causes the transistor associated with the channel (e.g., transistor M1) to be turned ON shortly thereafter the detected zero crossing, thereby limiting the duration of the OFF time.

In one embodiment, the TLM mode is activated in response to the monitored input voltage Vin exceeding a threshold value Vthreshold (e.g., 3.1 volts (V)). In this case, activation of TLM mode includes oscillator circuit 22 connecting the current source $I_{OFF}$ to current source Idrain through switch S4. Connecting current source $I_{OFF}$ to current source Idrain ensures a longer than desired OFF time is generated by preventing current source $I_{OFF}$ from charging capacitor C4. Providing a longer than desired OFF time prevents operation of the converter in the continuous conduction mode (CCM) (i.e., to ensure that each inductor is fully discharged before beginning the charging process). As a result, the OFF time is dictated by the monitored inductor current Is crossing the zero threshold. In this way, controller 18 employs a normal mode during those times in which the monitored load current cannot be employed to detect zero crossings, and activates the TLM mode when the monitored load current can be employed to detect zero crossings in an interleaved PFC converter.

Figure 3A:
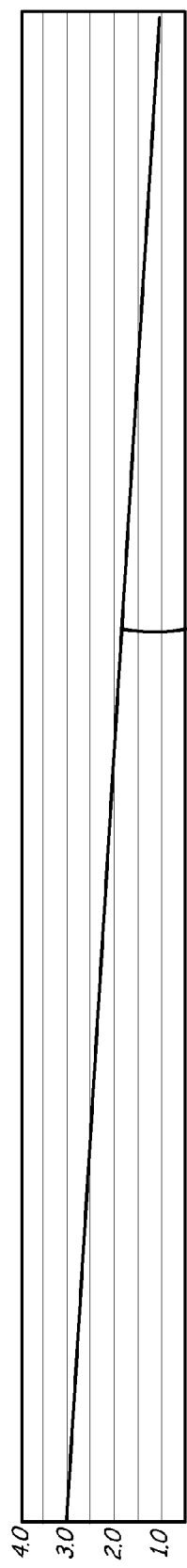
FIG. 3 is a waveform simulation illustrating operation of the controller in the time-limiting mode (TLM) according to an embodiment of the present invention.
Figure 3B:
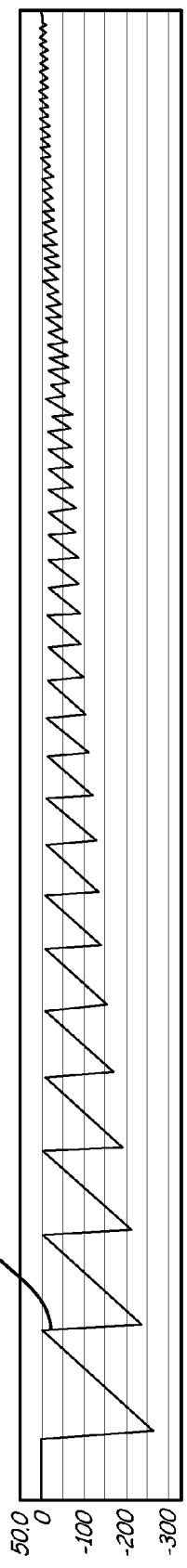
Figure 3C:
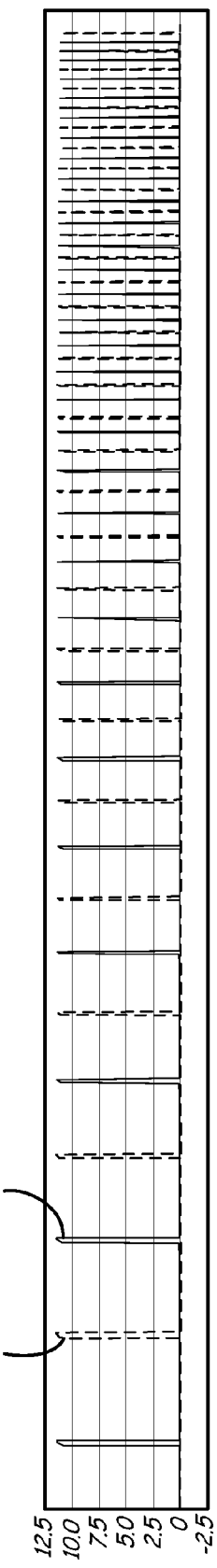

FIGS. 3A-3C are simulation waveforms illustrating operation of the gate drive circuitry in the time-limited mode according to an embodiment of the present invention. FIG. 3A illustrates the monitored amplified error signal Vcomp, FIG. 3B illustrates the voltage signal monitored at input terminal T1 (representing the inductor current Is), and FIG. 3C illustrates gate drive signals Gate1 and Gate2 provided to transistors M1 and M2, respectively, during operation in TLM mode.

As shown in FIG. 3A, the amplified error signal Vcomp decreases from a mid-range value to a low value. The duration of the ON times and OFF times of transistors M1 and M2 decrease with the decreasing amplified error signal Vcomp. This simulation illustrates the ability of the present invention to operate in TLM mode under various conditions.

As shown in FIG. 3B, the monitored inductor current Is represented by the voltage $V_{Is}$ provided to terminal T1 is employed to detect zero crossings of the inductor currents. Because the voltage provided at terminal T1 is inversely related to the monitored inductor current Is, as the monitored inductor current Is increases in magnitude the voltage at terminal T1 decreases. In this embodiment, the maximum inductor current Is is represented by a voltage value of approximately −450 mV. As the inductor current Is decreases the voltage $V_{IS}$ at terminal T1 increases towards zero. When the voltage $V_{Is}$ at terminal T1 reaches zero, the inductor current Is is equal to zero.

As shown in FIG. 3C, during TLM mode the gate drive signals are controlled in response to zero crossings of the monitored inductor current Is. As discussed above, the voltage $V_{Is}$ at terminal T1 is compared to a threshold value near zero (e.g., −50 mV), and in response to the monitored voltage $V_{Is}$ exceeding the threshold value the corresponding gate drive signal is turned ON. In this embodiment, gate drive signals Gate1 and Gate2 are alternately activated to turn ON transistors M1 and M2, respectively, illustrating the ability of the present invention to operate an interleaved PFC converter in DCM mode based on the monitored load current.

While the invention has been described with reference to an exemplary embodiment(s), it will be understood by those skilled in the art that various changes may be made and equivalents may be substituted for elements thereof without departing from the scope of the invention. In particular, portions of the invention have been described with respect to analog circuits, but in other embodiments digital circuits and/or processors employing a combination of hardware and software may be employed to implement the described functions. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An interleaved power factor correction (PFC) converter comprising:
   a rectifier circuit for converting an alternating current (AC) voltage to a rectified input voltage;
   a first power factor correction (PFC) sub-circuit having a first inductor and a first switching device, the first inductor connected to store energy provided by the rectified input voltage when the first switching device is ON and to discharge stored energy to a direct current (DC) output when the first switching device is OFF;
   a second power factor correction (PFC) sub-circuit connected in parallel with the first PFC sub-circuit and having a second inductor and a second switching device, the second inductor connected to store energy provided by the rectified input voltage when the second switching device is ON and to discharge stored energy to the DC output voltage when the second switching device is OFF; and
   a controller that provides gate drive signals to the first switching device and the second switching device to define ON and OFF times of each switching device to ensure operation of the interleaved PFC converter in a discontinuous conduction mode (DCM), the controller configured to operate in a normal mode in which OFF times of each switch are based on the rectified input voltage and the DC output voltage, and to operate in a time-limiting mode (TLM) in which OFF times of each switch are limited by detected near zero crossings of a monitored sum of inductor currents.

2. The interleaved PFC converter of claim 1, wherein the controller activates the TLM mode in response to the rectified input voltage exceeding a threshold value.

3. The interleaved PFC converter of claim 2, wherein the controller includes an oscillator circuit for generating the gate drive signals based on the rectified input voltage, the DC output voltage, the monitored sum of load currents, and an amplified error signal.

4. The interleaved PFC converter of claim 3, wherein for each gate drive signal the oscillator circuit includes:
   a current source $I_{ON}$ having a magnitude related to the amplified error signal;
   a current source $I_{OFF}$ having a magnitude related to the rectified input voltage and the DC output voltage;
   a current source $I_{TLM}$ having a constant value;
   at least one capacitor;
   a first comparator having a first input connected to an amplified error signal Vcomp and a second input connected to the capacitor, wherein the comparator generates a signal indicating when a capacitor voltage exceeds the voltage reference;
   a second comparator having a first input connected to a voltage representing the monitored sum of inductor currents and a second input connected to a near zero voltage reference;
   wherein during the normal mode a time required for the current source $I_{ON}$ to increase the capacitor voltage to a value greater than the voltage reference represents the ON time of the switching device and a time required for the current source $I_{OFF}$ to increase the capacitor voltage to a value greater than the voltage reference represents the OFF time of the switching device; and
   wherein during the TLM mode the current source $I_{TLM}$ charges the capacitor voltage to a value greater than the voltage reference in response to the voltage representing the monitored sum of inductor currents exceeding the zero voltage reference.

5. The interleaved PFC converter of claim 4, further including:
   a third comparator for comparing the rectified input voltage to a second voltage reference value, wherein the TLM mode is activated in response to the rectified input voltage exceeding the second voltage reference value, wherein during TLM mode the current source $I_{OFF}$ is connected through a leakage current source to ensure the OFF time is sufficient to discharge each inductor.

6. A method of controlling an interleaved power factor correction (PFC) circuit having at least two PFC sub-circuits connected in parallel with one another, each PFC sub-circuit having an inductor connected between a rectified input voltage and a DC output voltage, wherein a shunt switching device is selectively turned ON and OFF to charge and discharge the respective inductor, the method comprising:
   operating in a normal mode in which an ON time of each transistor is related to an amplified error signal and an OFF time of each transistor is related to the rectified input voltage and the DC output voltage, wherein operating in the normal mode includes generating an $I_{ON}$ current signal having a magnitude defined by the following equation:

$$I_{ON} = \frac{K}{Vcomp},$$

wherein K is a constant value and Vcomp is an amplified error signal, and wherein the magnitude of the $I_{ON}$ current signal dictates the ON time of each transistor, and generating an IOFF current signal having a magnitude defined by the following equation:

$$I_{OFF} = \frac{V_{FB} - V_{in}}{V_{in}} * I_{ON},$$

wherein the magnitude of $I_{OFF}$ current signal dictates the OFF time of each transistor; and activating a time-limiting mode (TLM) in which the OFF time of each transistor is based on a monitored sum of inductor currents of the interleaved PFC converter.

7. The method of claim 6, wherein the TLM mode is activated in response to the rectified input voltage exceeding a threshold value.

8. A controller for an interleaved power factor correction (PFC) circuit having a first PFC sub-circuit and a second PFC sub-circuit connected in parallel with the first PFC sub-circuit, each sub-circuit having a storage inductor connected between a rectified input voltage and a direct current (DC) output voltage, and a shunt transistor that is selectively turned ON and OFF to charge and discharge the storage inductor, the controller comprising:
 a first input terminal for monitoring a sum of inductor currents of the interleaved PFC converter;
 a second input terminal for monitoring the rectified input voltage provided to the interleaved PFC converter;
 a third input terminal for monitoring the DC output voltage; and
 an oscillator circuit that generates ON and OFF signals for each transistor, wherein the oscillator circuit operates in a normal mode to generate OFF signals having a duration defined by the monitored input voltage and the monitored output voltage, and operates in a time-limited mode to generate OFF signals having a duration limited by detected near zero crossing of the monitored sum of inductor currents.

9. The controller of claim 8, wherein for each sub-circuit, the oscillator circuit includes:
 a capacitor;
 a first comparator having inputs connected to a reference voltage and the capacitor and an output connected to provide ON and OFF signals to the respective shunt transistor based on the comparison;
 a second comparator having inputs connected to a voltage representative of the monitored load current and a voltage near zero value;
 an $I_{ON}$ current source connectable to selectively charge the capacitor, wherein a magnitude of the $I_{ON}$ current source defines, in part, a duration of the ON signal;
 an $I_{OFF}$ current source connectable to selectively charge the capacitor, wherein a magnitude of the $I_{OFF}$ current source defines, in part, a duration of the OFF signal;
 an $I_{TLM}$ current source;
 wherein during normal operation the $I_{ON}$ current source and $I_{OFF}$ current source determine the duration of the ON and OFF signals for the respective shunt transistor; and
 wherein during the TLM operation, the duration of the OFF time is limited in response to the monitored sum of load currents falling to a near zero value.

10. The controller of claim 9, wherein the magnitude of the $I_{ON}$ current source is defined by the following equation:

$$I_{ON} = \frac{K}{Vcomp},$$

wherein K is a constant value and Vcomp is an amplified error signal.

11. The controller of claim 9, wherein the magnitude of the $I_{OFF}$ current source is defined by the following equation:

$$I_{OFF} = \frac{V_o - V_{in}}{V_{in}} * I_{ON},$$

wherein $V_o$ is the DC output voltage and Vin is the rectified input voltage.

12. A method of controlling an interleaved power factor correction (PFC) circuit having at least two PFC sub-circuits connected in parallel with one another, each PFC sub-circuit having an inductor connected between a rectified input voltage and a DC output voltage, wherein a shunt switching device is selectively turned ON and OFF to charge and discharge the respective inductor, the method comprising:
 operating in a normal mode in which an ON time of each transistor is related to an amplified error signal and an OFF time of each transistor is related to the rectified input voltage and the DC output voltage;
 activating a time-limiting mode (TLM) in which the OFF time of each transistor is based on a monitored sum of inductor current of the interleaved PFC converter, wherein activating the TLM includes comparing the monitored sum of inductor currents to a near zero threshold value and limiting the OFF time of each transistor in response to the monitored sum of inductor currents decreasing below the zero threshold value.

13. The method of claim 12, wherein the TLM mode is activated in response to the rectified input voltage exceeding a threshold value.

* * * * *